(12) United States Patent
Reichard et al.

(10) Patent No.: US 9,688,152 B2
(45) Date of Patent: Jun. 27, 2017

(54) HYBRID POWER AND ENERGY FOR ROBOTS

(75) Inventors: Karl Martin Reichard, State College, PA (US); Christopher Mark Rogan, State College, PA (US); Elisha M. Hughes, State College, PA (US); Nathaniel John Hobbs, State College, PA (US); Heath Fred Hofmann, Ann Arbor, MI (US)

(73) Assignee: The Penn State Research Foundation, University Park, PA (US)

( * ) Notice: Subject to any disclaimer, the term of this patent is extended or adjusted under 35 U.S.C. 154(b) by 1117 days.

(21) Appl. No.: 13/554,148

(22) Filed: Jul. 20, 2012

(65) Prior Publication Data

US 2013/0020865 A1  Jan. 24, 2013

Related U.S. Application Data

(60) Provisional application No. 61/509,808, filed on Jul. 20, 2011.

(51) Int. Cl.
*B60L 1/00* (2006.01)
*B60L 11/00* (2006.01)
*B60L 11/18* (2006.01)

(52) U.S. Cl.
CPC ......... *B60L 11/005* (2013.01); *B60L 11/1861* (2013.01); *B60L 2200/40* (2013.01);
(Continued)

(58) Field of Classification Search
None
See application file for complete search history.

(56) References Cited

U.S. PATENT DOCUMENTS 6,344,985 B1  2/2002  Akerson
7,207,405 B2  4/2007  Reid et al.
(Continued)

OTHER PUBLICATIONS

Monroe, J. "Advanced Mobile Integrated Power System (AMPS)—STO," PowerPoint presentation, *United States Army Tank-Automotive and Armaments Command (TACOM)/Tank Automotive Research, Development and Engineering Center (TARDEC)*, Warren, Michigan, Jun. 10, 2003.
(Continued)

*Primary Examiner* — Jared Fureman
*Assistant Examiner* — Joel Barnett
(74) *Attorney, Agent, or Firm* — Dinsmore & Shohl LLP

(57) ABSTRACT

Advances in robot performance have been limited by a lack of advances in the mature field of battery technology. The focus of robotic power systems must expand from the use of single energy devices to the inclusion of multiple devices which can be optimized for a robotic platform. The challenge lies in the development of the hardware and control algorithms for a scalable power delivery architecture which satisfies the power and energy requirements of most unmanned ground vehicles. This invention is directed to an architecture which is easily scalable and facilitates the use of a wide variety of energy storage/generation devices, while focusing on the system control algorithm and its stability. The experimental results for an example system are presented demonstrating that the architecture functions properly when faced with real world robotic power demands.

6 Claims, 7 Drawing Sheets

(52) U.S. Cl.
CPC ....... *B60L 2210/14* (2013.01); *B60L 2210/30* (2013.01); *B60L 2240/547* (2013.01); *B60L 2240/549* (2013.01); *B60L 2260/32* (2013.01); *Y02T 10/7005* (2013.01); *Y02T 10/705* (2013.01); *Y02T 10/7022* (2013.01); *Y02T 10/7044* (2013.01); *Y02T 10/7225* (2013.01); *Y02T 10/7241* (2013.01)

(56) References Cited

U.S. PATENT DOCUMENTS

| | | |
|---|---|---|
| 7,427,450 B2 | 9/2008 | Raiser |
| 7,439,631 B2 | 10/2008 | Endou |
| 7,893,561 B2 | 2/2011 | Weidenheimer et al. |
| 7,914,917 B2 | 3/2011 | Nakashima et al. |
| 7,932,634 B2 | 4/2011 | Bourilkov et al. |
| 2001/0049038 A1* | 12/2001 | Dickman et al. ............... 429/19 |
| 2003/0155887 A1 | 8/2003 | Bourilkov et al. |
| 2003/0222502 A1 | 12/2003 | Takahashi et al. |
| 2004/0230844 A1* | 11/2004 | Zalesski ........................ 713/300 |
| 2007/0090808 A1 | 4/2007 | McCabe et al. |
| 2007/0188130 A1* | 8/2007 | Scheucher ................... 320/110 |
| 2007/0257654 A1* | 11/2007 | Krajcovic ................. H02J 1/14 323/297 |
| 2009/0146493 A1 | 6/2009 | Fujino et al. |
| 2009/0160252 A1 | 6/2009 | Kojima et al. |
| 2009/0171521 A1 | 7/2009 | Moki et al. |
| 2010/0156180 A1 | 6/2010 | Nishiyama |
| 2010/0244573 A1* | 9/2010 | Karnick ..................... H02J 7/34 307/80 |
| 2011/0084648 A1 | 4/2011 | Cao et al. |

OTHER PUBLICATIONS

Pierfederici, S. et al., "Differential Flatness-Based Control for Fuel Cell Hybrid Power Source," *Proceedings of the 1st International Conference on Technical Education (ICTE2009)*, Bangkok, Thailand, Jan. 21-22, 2010.

Sudheer, K. et al., "Fuzzy and PI Control of Hybrid Fuel Cell/Battery Distributed Generation Systems," *International Journal of Modeling and Optimization*, 1(2):95-100 (2011).

Thounthong, P. et al., "Control strategy of fuel cell/supercapacitors hybrid power sources for electric vehicle," *Journal of Power Sources*, 158(1):806-814 (2006) (Abstract).

Thounthong, P. et al., "Energy management of fuel cell/battery/supercapacitor hybrid power source for vehicle applications," *Journal of Power Sources*, 193(1):376-385 (2009).

\* cited by examiner

HYBRID POWER AND ENERGY FOR ROBOTS

REFERENCE TO RELATED APPLICATION

This application claims priority from U.S. Provisional Patent Application Ser. No. 61/509,808, filed Jul. 20, 2011, the entire content of which is incorporated herein by reference.

STATEMENT OF GOVERNMENT SPONSORSHIP

This invention was made with government support under N00024-02-D-6604 awarded by the Naval Sea Systems Command. The government has certain rights in the invention.

FIELD OF THE INVENTION

This invention relates generally to robotics and, in particular, to a hybrid power and energy system which is particularly suited to robotic and unmanned vehicles.

BACKGROUND OF THE INVENTION

Currently, the limiting factor in electric vehicle design and performance is often the energy source. This problem has been recognized in the automotive industry, and much research has gone into alternatives to batteries, or augmenting battery power through a hybridization scheme. Very little research has gone into doing the same for robots and other unmanned systems. The research in the robotics field has focused mainly on optimizing the efficiency of particular power converter designs, and efficient energy management. There has been no effort to standardize the design of robot power systems through the use of a scalable power delivery architecture.

SUMMARY OF THE INVENTION

This invention resides in a hybrid power and energy system called HyPER which is particularly suited to robotic and unmanned vehicles. The goal of the HyPER system architecture is to provide a power system architecture which can be applied to any size robotic platform and accommodate a variety of energy storage devices. The benefits of the HyPER system architecture are not limited to providing flexible sources of electrical power to the robot; the system architecture also facilitates power source optimization and management which can improve robot capability, extend the operating time/range of the robot, and extend the life of the energy storage devices.

The HyPER system architecture is composed of a number of scalable current sink-source modules (CSSM) to control energy flow from individual energy sources, a matching number of Energy Source Adapters (ESA) to provide a control interface to each energy source or storage device, a Master Power Management Controller (MPMC) to control the relative contribution of each source to the overall energy requirement of the robot, HyPER Load Adapters (HLA) to control the energy use of individual devices or loads on the robot, and an open communication language for controlling the energy use in the system from source to load. This architecture is easily configured to include any number of energy storage devices and electrical loads, as dictated by the power requirements of a particular robot or mission.

A unique aspect of the invention involves the allocation of power and energy from the sources based on the frequency content of the power and energy demand from the electrical loads. While the detailed description discusses this in the context of a li-ion battery and ultracapacitor as the power and energy sources, the scheme can be applied to any collection of sources since they each will have their own respective preferred load frequency content (load power and energy rate of change).

DETAILED DESCRIPTION OF THE INVENTION

Figure 1:
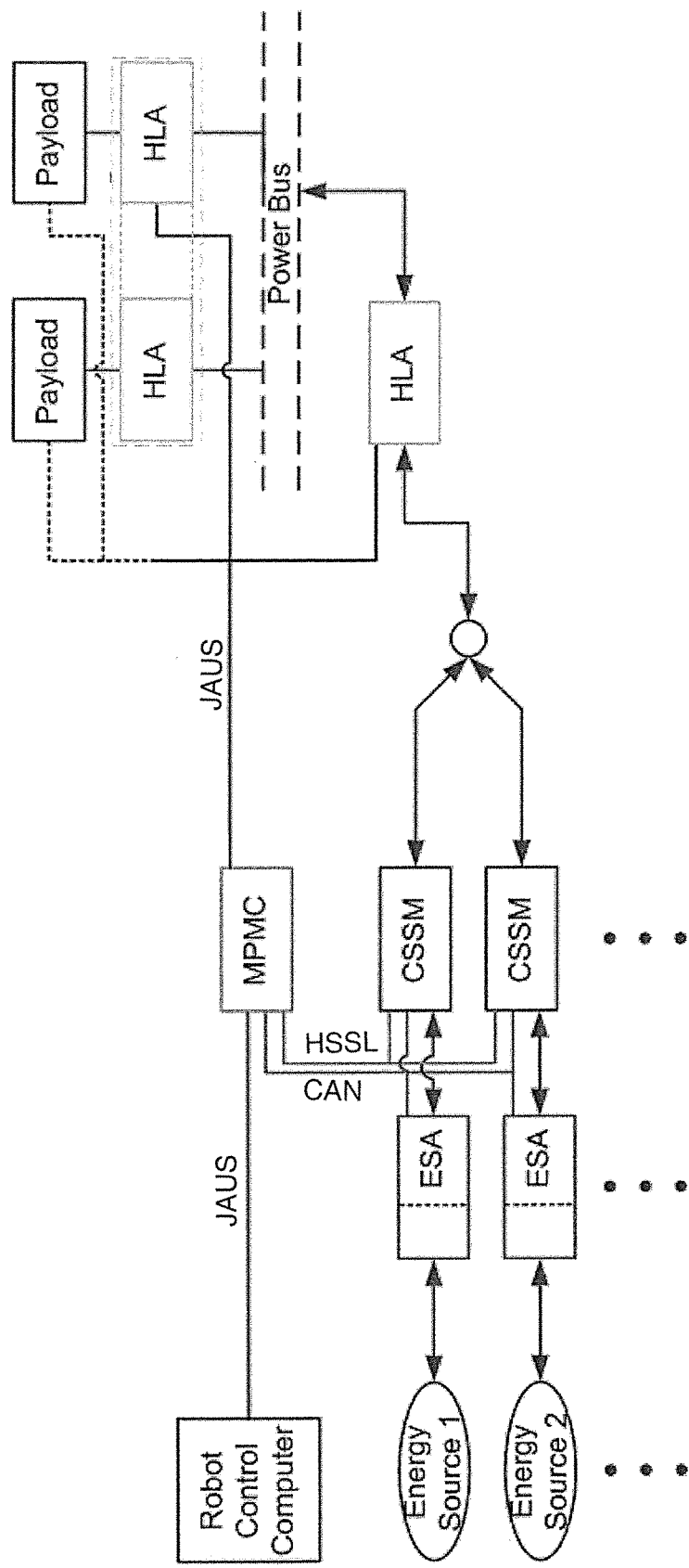
FIG. 1 is a block diagram that illustrates the scalable HyPER architecture.

The system shown in FIG. 1 presents an overview of the preferred embodiment of the invention. A number of scalable current sink-source modules (CSSM) control energy flow from individual energy sources, a matching number of Energy Source Adapters (ESA) to provide a control interface to each energy source or storage device, a Master Power Management Controller (MPMC) to control the relative contribution of each source to the overall energy requirements, HyPER Load Adapters (HLA) to control the energy use of individual devices or loads on the robot, and an open communication language for controlling the energy use in the system from source to load. Messages are implemented using the Joint Architecture for Unmanned Systems (JAUS), but can be implemented in a standalone system that is not fully JAUS compliant. The main robot power bus provides the supervisory controller a control variable to use for robot power bus voltage regulation. The MPMC coordinates the power delivery among the CSSMs, ensuring the main robot power bus is regulated to a predetermined energy (voltage) level.

Current Sink/Source Modules

The core of the HyPER system is the current sink source module (CSSM). The CSSM is a wide input range, adjustable output voltage, bidirectional DC-DC converter. The purpose of this bidirectional DC-DC converter is to supply a commanded current instantaneously. There is no need for isolation which makes the design of the converter relatively simple. The main requirement of the converter is bidirectional power flow capability. This capability provides the system with the ability to utilize regeneration techniques to recapture otherwise wasted energy and also provides the ability to transfer energy from one device to another device.

Figure 2:
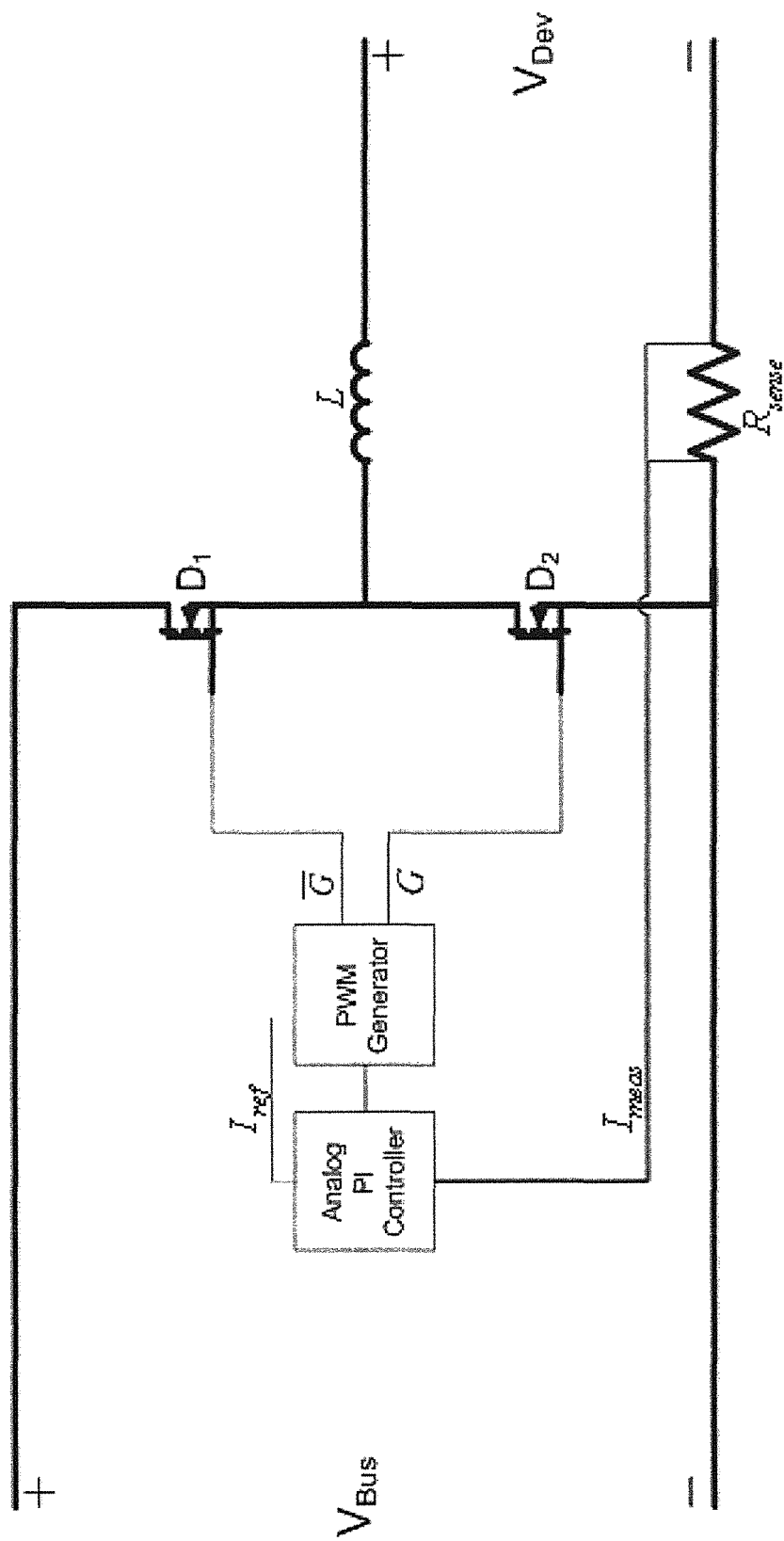
FIG. 2 is a simplified schematic that shows the scalable current sink-source modules (CSSM) topology.

An example of energy transfer between devices is when a generator is present in the system and recharges batteries. The topology of the synchronous boost converter, shown in FIG. 2, fits the bidirectional requirement and provides an easily scalable topology.

Similar conversion topologies have been previously used in many different applications. It is often used in synchronous rectification and other applications requiring high efficiency. For this application the converter includes a high bandwidth proportional-integral (PI) current regulator to quickly regulate the inductor current. By measuring the inductor current and comparing it to a reference command, a pulse-width-modulated (PWM) signal is generated to control the switching of MOSFETs $D_1$ and $D_2$. The speed of the control loop contributes to the overall stability of the system as described later in the stability analysis.

Master Power Management Controller

To implement the converters in a power delivery system, while maintaining the flexibility to use different energy storage elements and optimize energy system performance for a wide range of mission energy requirements, there must be a supervisor coordinating the energy devices to prevent contention between sources and system instability. The MPMC is implemented as a two level controller for the hybrid architecture. A low-level controller regulates the voltage of the main robot power bus by generating current commands for each CSSM in the system. A high-level controller manages the energy storage devices, by monitoring and controlling their state of charge, monitoring and controlling any loads present in the system, and configuring the low-level controller parameters to match the characteristics of the energy storage devices. The low-level control functionality of the MPMC is separate from and in addition to the PI current regulator on the converter itself. The low-level controller generates the current command for the current regulator on the CSSM.

The high-level controller of the MPMC has three main functions. First, it monitors the individual energy storage devices through a CAN link to the ESAs. This includes ensuring all energy storage devices are within safety limits, calculating state of charge or energy production capability, and recording real time current and voltage. The second function is the control of the energy storage devices based on system's state of charge, or on a particular mission's requirements. For example it can turn on a generator or place a battery in charge mode, if its state of charge drops too low. Third, it configures the low-level controller at any time as the operating conditions change. For example if a storage device is completely depleted, the MPMC can remove the device from the system, which then entails a reconfiguration of the low-level controller. Beyond these main functions, there are many other potential applications for the high-level controller. These include hosting health monitoring algorithms, optimizing energy use, mission energy requirement estimation, implementing mission-programmable operation modes, and providing primary and auxiliary load control.

The low-level controller of the MPMC is responsible for the generation of power commands to the current sink-source module controlling the flow of energy in and out of its respective energy source. One method for determining the power command for a specific device, which has been demonstrated, is the use of power frequency filtering algorithms. The filtering algorithm for a particular energy source matches the frequency characteristics of the portion of the power requested by the electrical load to the frequency response characteristics of the energy source. For example, electric generators are inherently low frequency power sources (they are designed to provide steady power with minimal or slow variations); batteries are examples of mid range components; ultracapacitors are examples of high frequency components, capable of providing short bursts of high power. The filtering algorithm permits each device to supply power in a range where it is most efficient.

Figure 3:
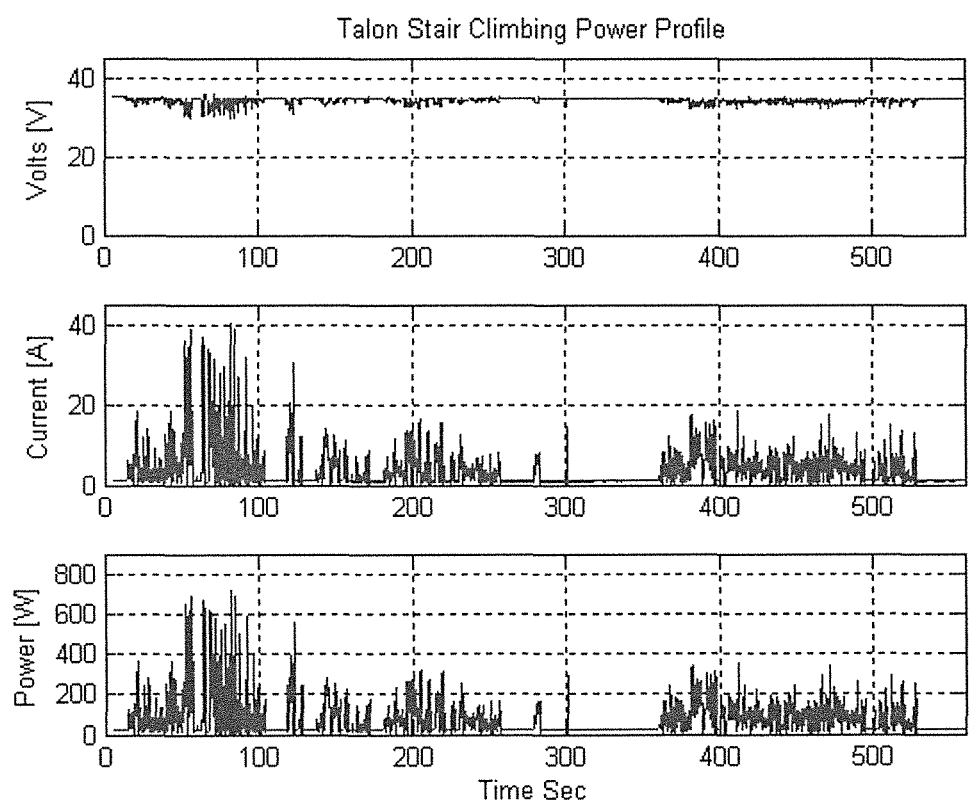
FIG. 3 is a series of graphs that depict a Talon® stair climbing power profile.

FIG. 3 is a Talon® robot power profile which was recorded during a stair climbing exercise. This profile shows that the load is very peaky (corresponding to high frequency power requirements) which indicates that ideally the power for the peaks would be supplied by an ultracapacitor. Generating a control signal to supply this power profile is achieved by feeding the bus capacitor energy back through a relatively slow PI controller. The power command can then be allocated to the specific devices using a filtering algorithm.

Energy Source Adapter

The Energy Source Adapter's function is to facilitate the integration of any energy storage device into the HyPER system. Physically, the ESA converts the connector on the storage device to a connector compatible with the CSSM's connector. Logically, it provides much more to the system. It communicates through a CAN link to the MPMC in order to send data about the energy storage device and to receive commands to control operation of the energy storage device if the device has control capability. Data provided by the ESA may include operating data such as current, voltage, state of charge, and other operating characteristics of the device. Providing operating parameters allows the MPMC to automatically discover and manage the device. This auto discovery function is the key to enabling the HyPER system's self-configuration. The operating parameters of the device inform the MPMC how to configure the low-level controller in order to optimally utilize the energy available from the device. The final function of the ESA is to provide the MPMC with the capability to control the operating mode of the device. For example it would allow the MPMC to place a BB2590 in charge mode. Ideally, original equipment manufacturers will build ESA functionality into their devices; however, the use of separate, add-on ESA's which are programmed with the information for a particular energy storage device is also possible. Add-on ESA's can be implemented as stand-alone devices or ESA functionality can be integrated into the power system.

HyPER Load Adapter (HLA)

The HyPER Load Adapter provides information about and control over a robot payload's energy use. A set of messages based on the JAUS protocol are used to communicate between the HLA and the MPMC. The HLA provides the MPMC with vital parameters of the payload, providing power usage and health monitoring of the payload, and the capability to shut off the power to the payload. The adapter could be implemented as a standalone device or as an integrated part of the robotic payload. The HLA can also be used to provide a disconnect between the CSSM output and the main power bus.

Stability Analysis

The stability analysis of the HyPER system is challenging due to system nonlinearities introduced by inefficiencies in the converter. It is difficult to derive a traditional Lyapunov stability analysis for the system, since energy is already the state of interest. Intuitively it makes the most sense to use power as a state to show that the energy on the capacitors is stable. The non-linearity is still a problem; however, if certain assumptions are made, the analysis could be linearized.

The first assumption that will be made to simplify the analysis is that the power commanded to the converter and the power supplied by the converter are identical. This also assumes that the power commanded is within the capability of the energy source, which can be ensured by limiting it in the MPMC software. The high bandwidth PI current regulator on the CSSM ensures that the commanded current and supplied current are identical. By assuming that the supervisory controller response is much slow than the response of the PI current regulator, it can be shown that the two are, for purposes of this analysis, identical.

Second, the losses in the converters can be neglected. There are two rationales for being able to neglect these losses. The first assumes that the converters are sized appropriately for the system and thus will be operating in an efficient range, usually above 90% efficiency. The second takes advantage of the fact that no assumptions are made about the robot power demand. On account of this the losses in the converter can be lumped in with the load, rather than with the converter.

The third assumption is that the losses associated with the storage device can be neglected. This loss does not really affect the stability of the system. It just reduces the total energy available to the system. These inefficiencies are relatively small and can simply be neglected or measured and included in the algorithms used by the MPMC to determine the optimal distribution of energy from the sources.

Figure 4:
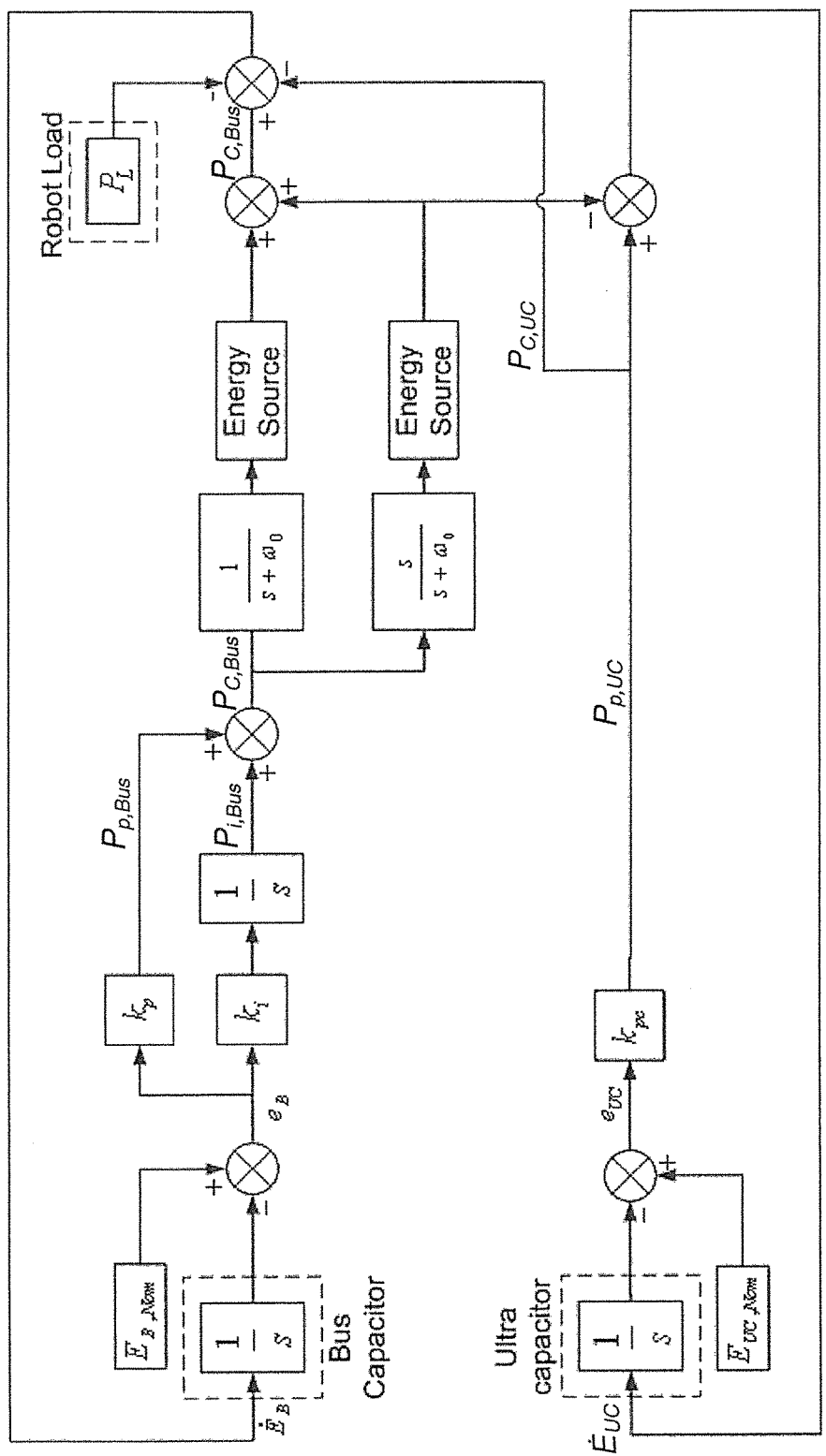
FIG. 4 is a diagram that shows a HyPER system power flow equivalent model.

FIG. 4 is the power flow equivalent schematic of a simple HyPER system. Note that the capacitors have been replaced by integrators, the converters have been dropped from the system, and it is assumed the energy sources sink or source the commanded power to them. It was found during simulation that ultracapacitor energy density is insufficient for continuous operation. Since an ultracapacitor cannot supply dc power, it should not be commanded to do so during operation. However, the inefficiencies of the converter cause a disturbance to the ultracapacitor, essentially adding a DC component to its power command. This causes the stored energy to decrease. This drop was compensated for by adding a feedback control around the ultracapacitor, represented by the lower loop.

Figure 5:
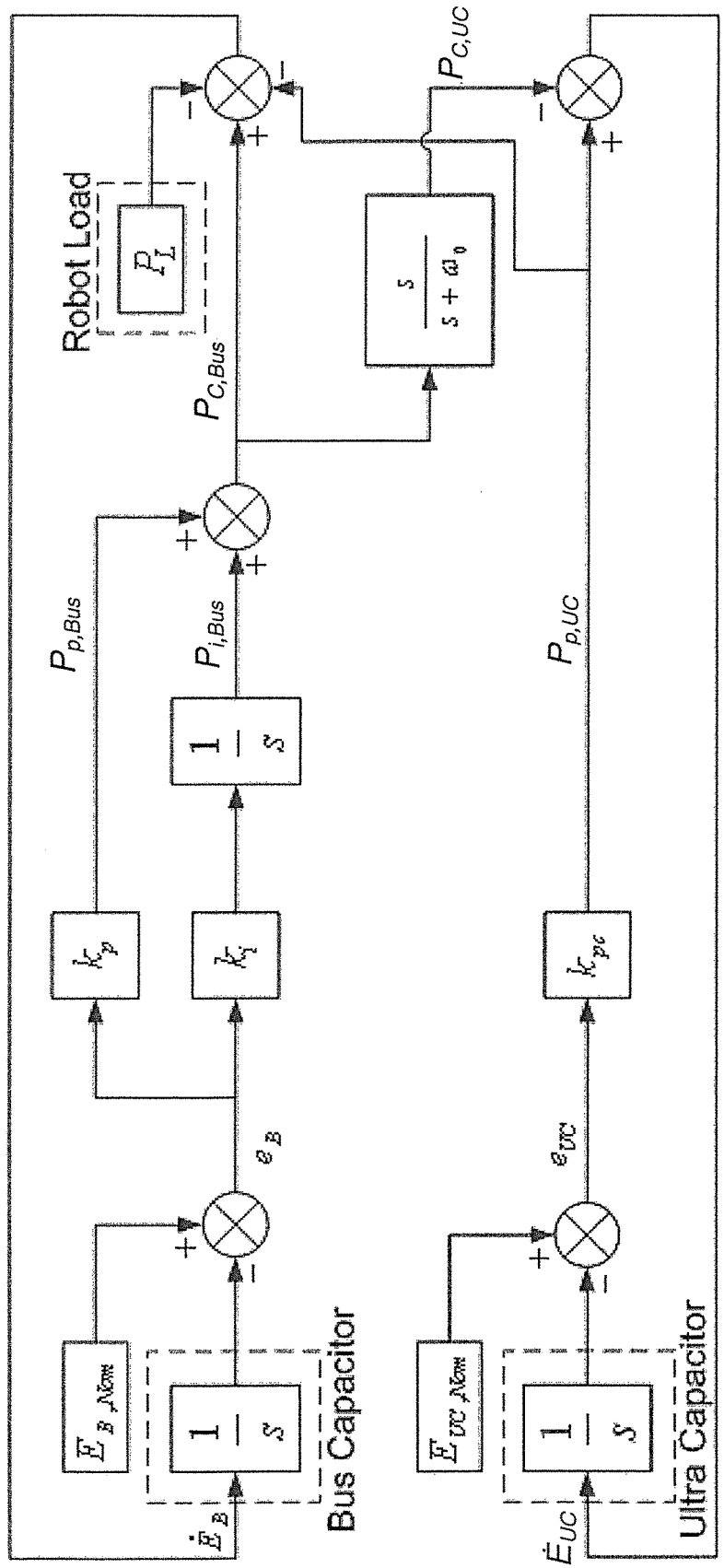
FIG. 5 shows a simple HyPER system control model.

FIG. 5 shows a simple HyPER system control model. Although the Figures only shows two energy sources, the filtering algorithm guarantees that the output of the algorithm always sums to the input, regardless of the number of energy storage devices present; hence the block diagram representation of the system can always be reduced to the two devices as shown. Though the figure represents the filtering algorithm as a high pass and low pass filter, this is only done for clarity. The actual filtering algorithm utilizes only low pass filters. This guarantees that the filter algorithm has a unity gain. This fact allows the further simplification to the model below.

This simplified model is now a linear model of the power flow and energy levels in the HyPER system. It can be shown that the model is described by the state space system in equation:

$$\begin{bmatrix} \dot{E}_B \\ \dot{P}_{i,Bus} \\ \dot{X} \\ \dot{E}_{UC} \end{bmatrix} = \begin{bmatrix} -k_p & 1 & 0 & k_{pc} \\ -k_i & 0 & 0 & 0 \\ k_p & 1 & -\omega_0 & 0 \\ -k_p & -1 & \omega_0 & -k_{pc} \end{bmatrix} \quad (1)$$

$$\begin{bmatrix} E_B \\ P_{i,Bus} \\ X \\ E_{UC} \end{bmatrix} + \begin{bmatrix} k_p \\ k_i \\ -k_p \\ k_p \end{bmatrix} E_{B,Nom} + \begin{bmatrix} -k_{pc} \\ 0 \\ 0 \\ k_{pc} \end{bmatrix} E_{UC,Nom} - \begin{bmatrix} P_L \\ 0 \\ 0 \\ 0 \end{bmatrix}$$

Using basic linear control theory it can also be shown that the eigenvalues of the state space system are always in the left half of the complex plane, making the overall system always stable.

Test Results

The system derived in the stability analysis was simulated in SIMULINK®, and it was shown that the system operated as desired. A working prototype system was built using an electronically controlled load bank to simulate a robot power load. The stair climbing profile shown previously in FIG. 1 was used for the testing. For simplicity in the testing only two devices were used. The low frequency device was a bb2590 Li-Ion battery, and the high frequency device was a Maxwell BoostCap® ultracapacitor.

Figure 6:
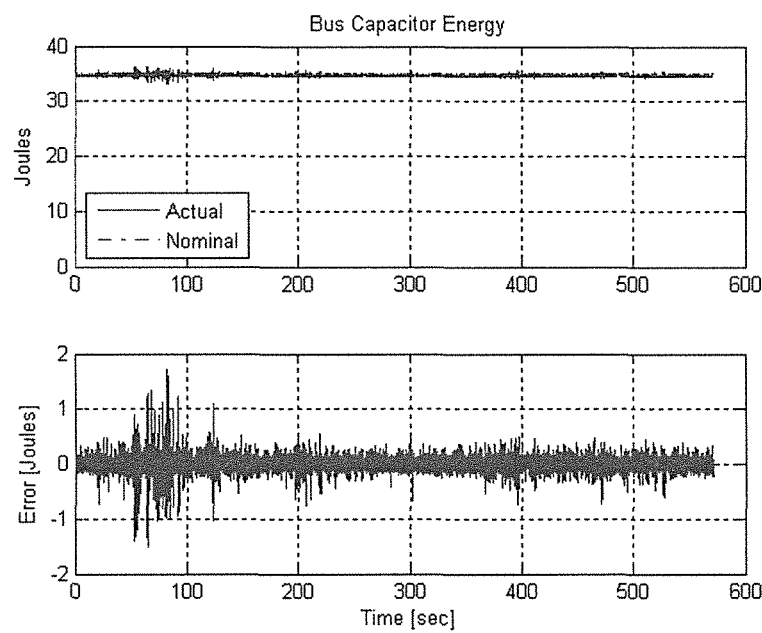
FIG. 6 is a graph that shows regulated bus energy in joules (upper plot). The error (bottom plot) is less than two joules, which is equivalent to a bus voltage error of less than one volt.
Figure 7:
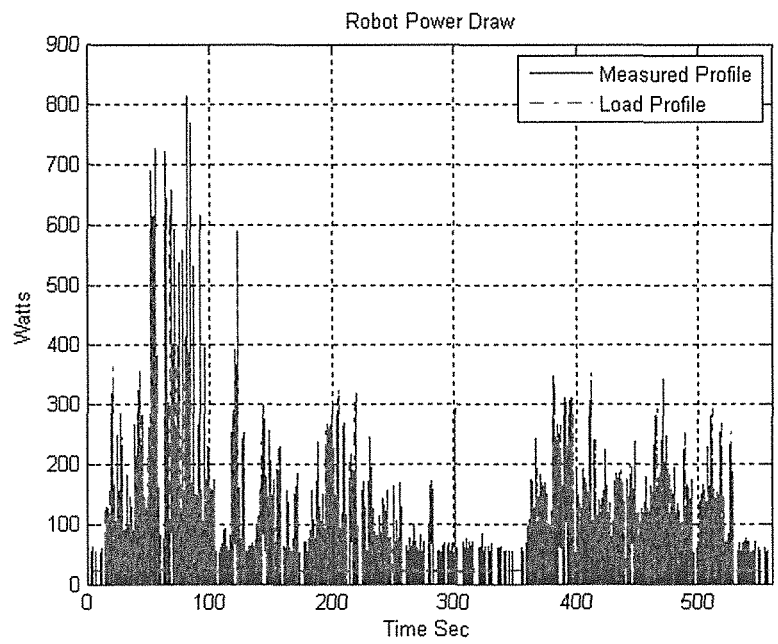
FIG. 7 shows the desired load profile and the corresponding power sourced by the HyPER system.

FIG. 6 shows the regulated bus energy, shown in joules (upper plot). The error (bottom plot) is less than two joules, which is equivalent to a bus voltage error of less than one volt. FIG. 7 shows the desired load profile and the corresponding power sourced by the HyPER system. The plot demonstrates that the system is capable supplying the required power to the robot. Together these two plots show that the controller functions properly. However, it would be beneficial to see that the filtering algorithm works properly, and that the energy storage devices are operating in their optimal frequency range. As previously noted, the low frequency power was supplied by a Li-Ion battery and the high frequency power was supply by an ultracapacitor.

Figure 8:
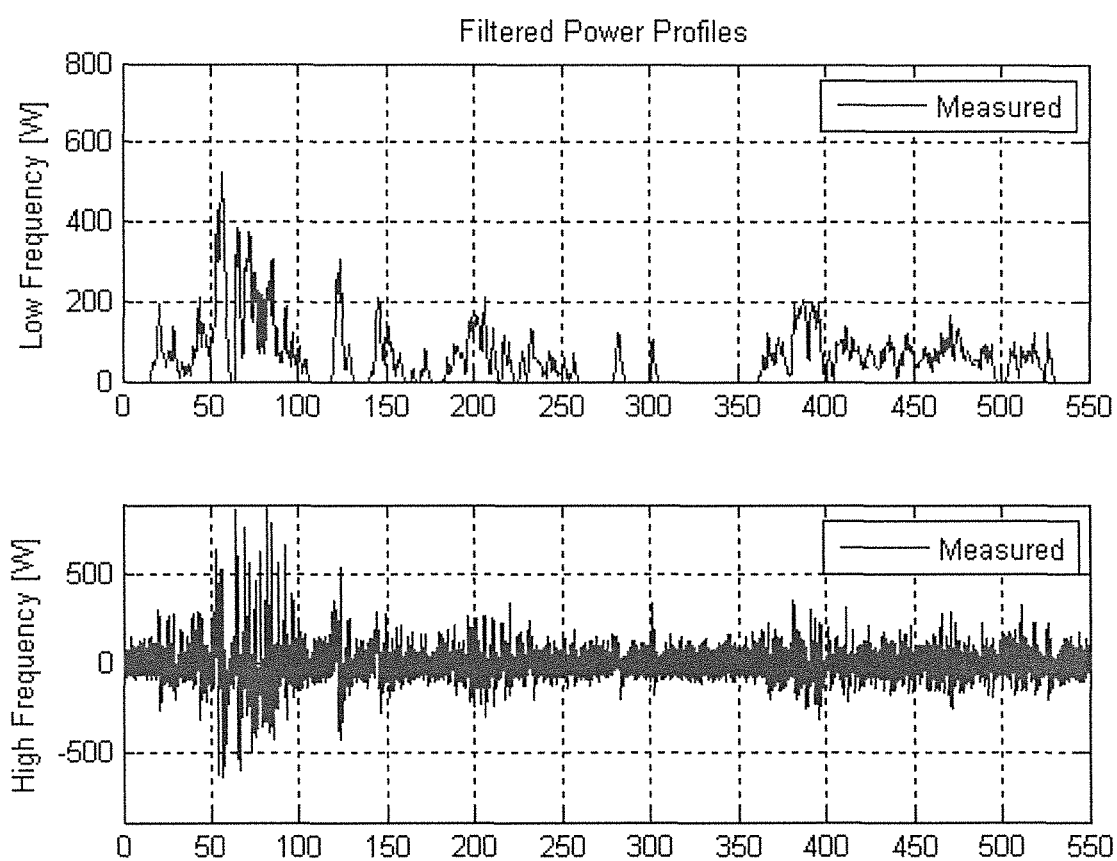
FIG. 8 illustrates high and low frequency power. The top subplot the low frequency profile. The ultracapacitor, which supplies the high frequency power is shown in the bottom subplot.

For the purposes of this test a filter with a cutoff frequency 0.1 Hz, which can easily be changed, was used. The top subplot in FIG. 8 shows the low frequency profile. The low frequency demand is supplied by the battery and still contains high surges of power, but it is supplying only surges that last longer than a couple of seconds. The ultracapacitor, which supplies the high frequency power shown in the bottom subplot of FIG. 8, is easily capable of supplying more of this energy, indicating that the cutoff frequency should be lowered. This would have the added benefit of relieving the battery of some of its more peaky demands.

CONCLUSION

The scalable HyPER architecture provides a solution to the energy problem that has traditionally faced robotics. It has been shown that this architecture is capable of providing the power and energy needs of the Talon® robot with just two devices. It has also been shown, through the stability analysis, that this architecture can be expanded to include multiple other devices which allows the use of the scalable architecture on large platforms. The features of the architecture provide the easy configuration of the system, while monitoring, managing, and optimizing, the energy flow throughout the system. The benefits of the HyPER system can extend the useful operation time of the platform and also extend the useful life of the energy storage devices.

The HyPER architecture presents a number of innovative developments in robot power and energy system flexibility and capability. Not only does the architecture provide power system commonality between different robots and different sizes of robots, the architecture also provides the link between incorporating new energy storage and generation technologies and allowing compatibility with older technologies.

The HyPER architecture is the first robot power system to intelligently integrate available energy sources without prior knowledge of source capability and characteristics or system configuration. The incorporation of the ESAs with the energy sources allows the MPMC to immediately interface with any device. This plug and play feature allows the MPMC to automatically reconfigure the power system based on the available energy sources. It enables the MPMC to configure the most efficient power route and to optimally utilize the individual energy sources based on their fundamental characteristics. Not only does this flexibility increase the functionality and usefulness of MPMC, it also opens the door to the use of common energy devices across robot platforms. Now, the same energy device used on one robot platform can be used on a similar platform from a different manufacturer.

The ESA also enables the MPMC to configure the most efficient power route and to optimally utilize the individual energy sources. Not only does this flexibility increase the functionality and usefulness of MPMC, it also opens the door to the use of common energy devices across robot platforms. Now, the same energy device used on one robot platform can be used on a similar platform from a different manufacturer. This commonality is not limited to the use of robot energy sources. The architecture flexibility allows the robot to use essentially any common energy source, such as batteries used in radios.

The scalability of the architecture provides the capability to build power systems of different sizes (in terms of energy and power capacity). The same architecture, which can be applied to a small man-portable robot, can be scaled and applied to a large robot. The scalable property of the power system creates a building block, which is a step toward the feasibility of modular robotic platforms.

The invention claimed is:

1. A hybrid power and energy system for robotic and unmanned vehicular applications, comprising:
    a plurality of electrical energy sources or storage devices, each electrical energy source or storage device having a load frequency content relating to load power and energy rate of change, at least one of the plurality of electrical energy sources or storage devices having a different load frequency content relating to load power and energy rate of change compared to another of the plurality of electrical energy sources or storage devices;
    a plurality of scalable current sink-source modules to control energy flow from each electrical energy source or storage device, at least one of the plurality of scalable current sink-source modules having bidirectional energy flow capability;
    a plurality of energy source adapters (ESAs) providing a control interface to each electrical energy source or storage device;
    a master power management controller (MPMC) to control a contribution of each electrical energy source or storage device through the ESAs to meet overall energy requirements of the hybrid power and energy system; and
    at least one power device or load in electrical communication with at least one of the plurality of scalable current sink-source modules, each of the at least one power device or the load having a frequency content in its power and energy demand,
    wherein the ESAs enable the MPMC to configure a power route to utilize the electrical energy sources or storage devices based on the frequency content of the power and energy demand of the at least one power device or the load.

2. The hybrid power and energy system of claim 1, further including a plurality of load adapters to control the energy use of the at least one power device or the load.

3. The hybrid power and energy system of claim 1, wherein the ESAs enable the MPMC to automatically reconfigure the hybrid power and energy system based on the plurality of electrical energy sources or storage devices.

4. The hybrid power and energy system of claim 1, wherein the ESAs enable the MPMC to configure the route based on the load frequency content of the plurality of electrical energy sources or storage devices.

5. The hybrid power and energy system of claim 1, wherein the ESAs enable the MPMC to configure a power route to recapture energy from the at least one power device or the load and to transfer that energy to at least one of the plurality of electrical energy sources or storage devices.

6. The hybrid power and energy system of claim 1, wherein the ESAs enable the MPMC to configure a power route to transfer energy from one of the plurality of electrical energy sources or storage devices to another of the plurality of electrical energy sources or storage devices.

* * * * *